INVENTOR.
Harold T. Blum
BY
Frease & Bishop
ATTORNEYS

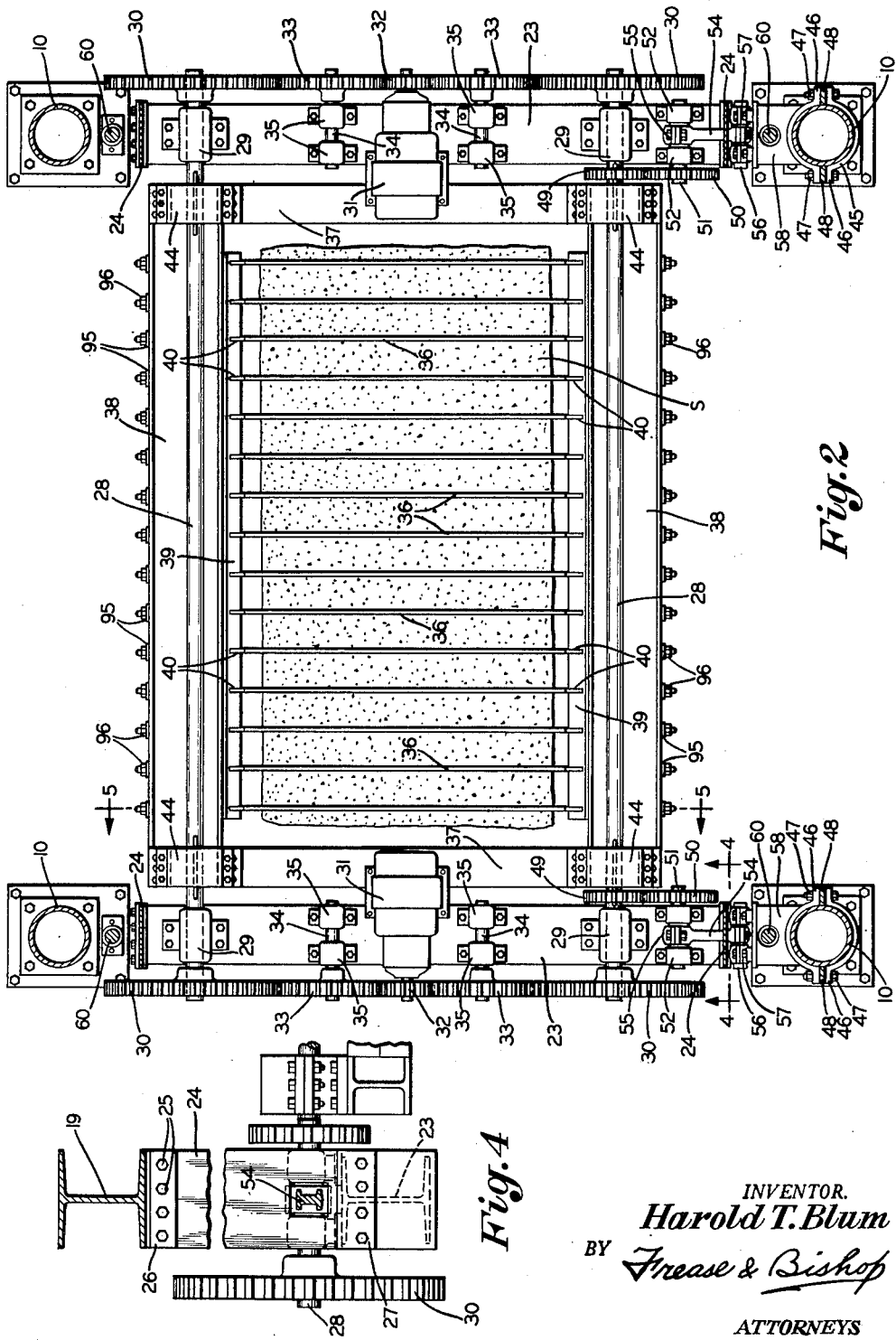
July 2, 1957 — H. T. BLUM — 2,797,679
GANG SAW MACHINE WITH AUXILIARY RECIPROCAL MOVEMENT OF SAW FRAME
Filed Dec. 8, 1955 — 4 Sheets-Sheet 2
INVENTOR.
Harold T. Blum
BY Frease & Bishop
ATTORNEYS

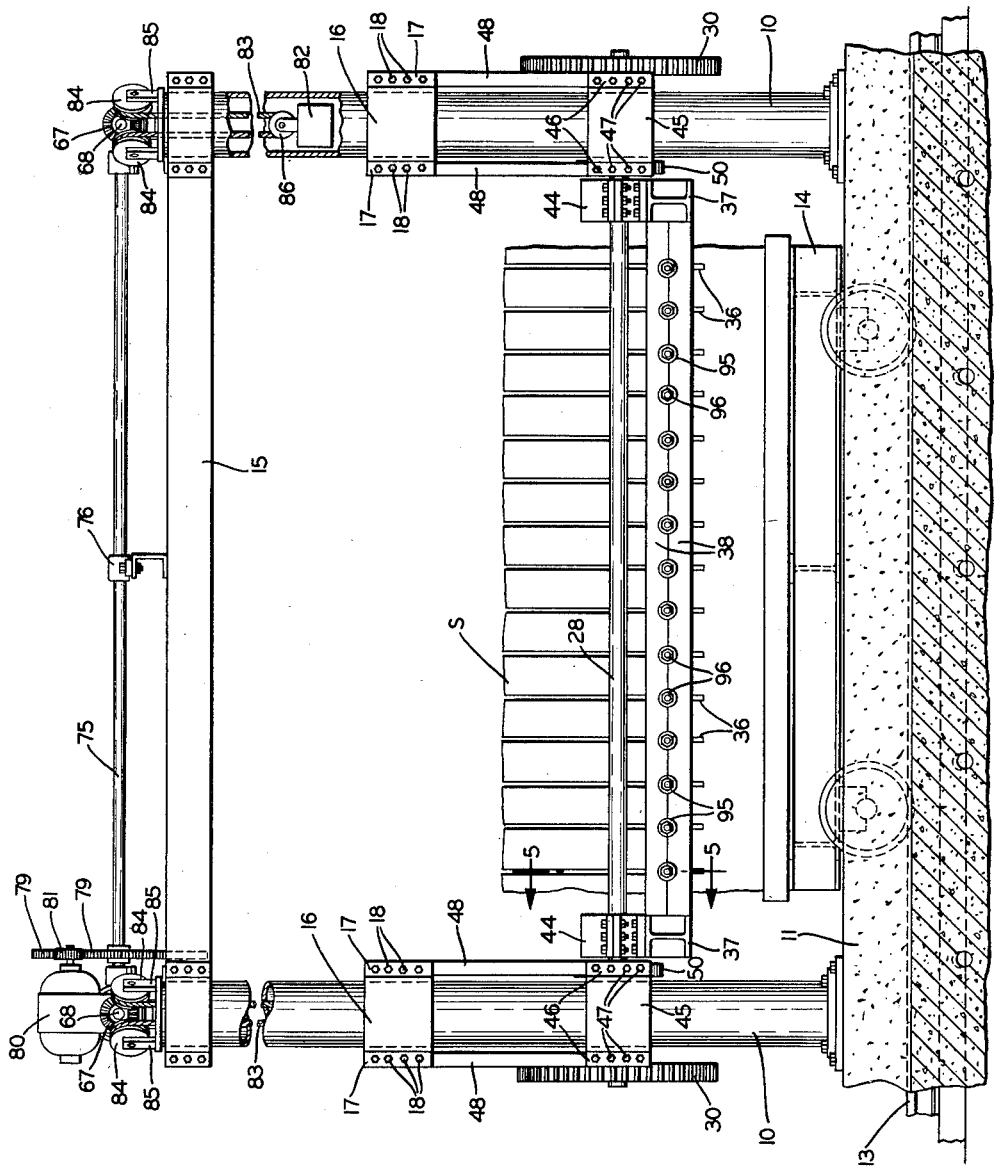

July 2, 1957
H. T. BLUM
2,797,679
GANG SAW MACHINE WITH AUXILIARY RECIPROCAL
MOVEMENT OF SAW FRAME
Filed Dec. 8, 1955
4 Sheets-Sheet 4
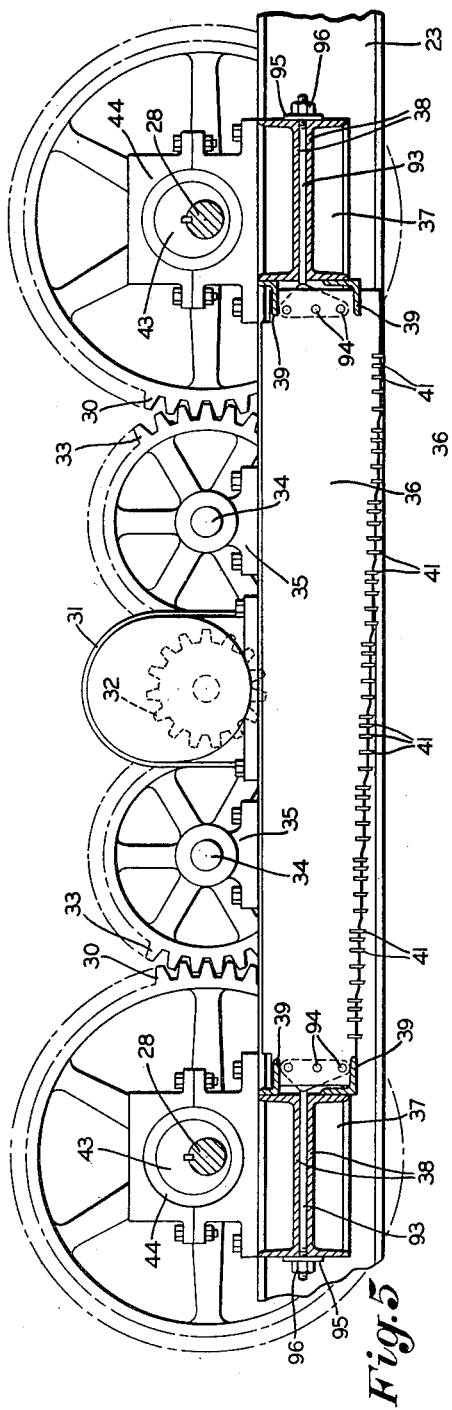
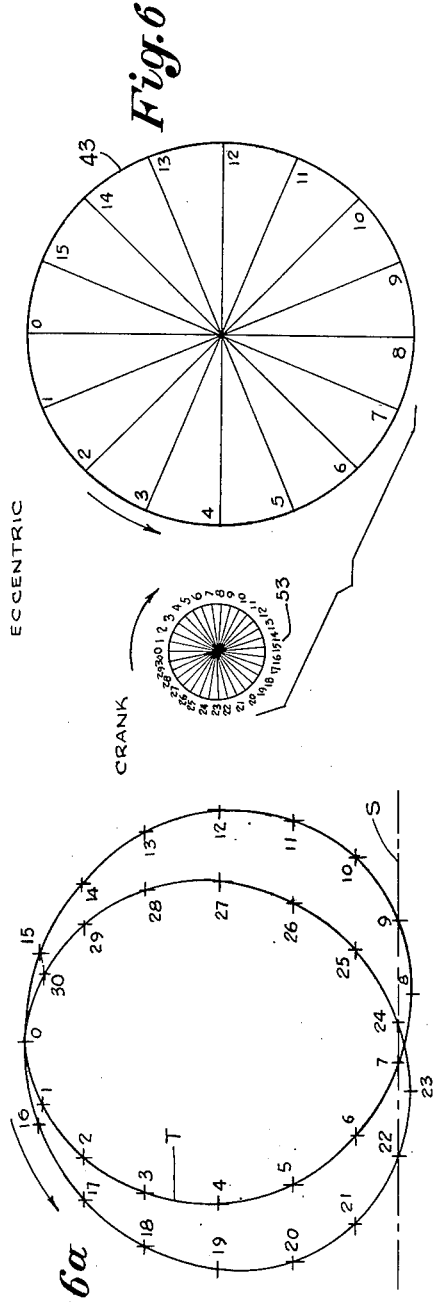
INVENTOR.
*Harold T. Blum*
BY
*Frease & Bishop*
ATTORNEYS

United States Patent Office 2,797,679
Patented July 2, 1957

2,797,679

GANG SAW MACHINE WITH AUXILIARY RECIPROCAL MOVEMENT OF SAW FRAME

Harold T. Blum, near Millersburg, Ohio, assignor to The Briar Hill Stone Company, Glenmont, Ohio, a corporation of Ohio Application December 8, 1955, Serial No. 551,827

15 Claims. (Cl. 125—16)

The invention relates to gang saw machines for cutting large blocks of stone into a plurality of slabs, and more particularly to such a machine having a reciprocal gang saw frame, and the present application is an improvement upon the general type of gang saw machine disclosed in my prior United States Letters Patent No. 2,720,199 and No. 2,270,200, dated October 11, 1955, and is especially adapted for use in association with saw blades of the type disclosed in my prior application, Serial No. 538,847, filed October 6, 1955, which issued as Patent No. 2,775,236, December 25, 1956.

In the production of sawed stone, such as limestone, sandstone, marble and granite, for building purposes and the like, the stone is removed from the quarries in huge blocks weighing up to twelve or fifteen tons. These blocks are then transported to the mill where they are cut into slabs of desired thickness.

Prior to the production of gang saw machines such as disclosed in my above-mentioned Patents No. 2,720,199 and No. 2,720,200, the general practice of accomplishing this sawing operation was by means of a common type of gang saw machine having a swing frame provided with a gang of saw blades in the form of plain, smooth-edged steel blades.

Such swing frame is suspended in the main frame of the machine and continuously swung back and forth by means of a pitman rod driven by a pitman wheel upon a Hurst frame located at a distnce from the main frame of the machine, whereby the gang of saws moves back and forth in an arcuate path, contacting the stone on each forward and backward movement.

As the saw blades have no teeth, it is necessary to continuously deliver an abrasive such as silica sand, steel shot, or the like and water beneath the saw blades causing them to slowly wear into the stone. Since the blades are moved back and forth in an arcaute path, the stone cuttings, dust and sludge, collecting in the kerfs worn into the stone, are moved alternately back and forth beneath the blades, impeding the cutting action thereof. Therefore, the cutting operation is very slow and costly, when performed upon such machines. Furthermore, these machines are quite large and expensive, and they occupy a large amount of floor space in the mill.

Gang saw machines of the type of my Patents No. 2,720,199 and No. 2,720,200, in which a gang of saw blades, with inserted hardened teeth of carboloy or the like, is moved in a circular path, have been found by actual use to be far superior to this old type of swing frame machine.

Not only do these machines cut the stone in only a small fraction of the time required by the old style of swing-frame machine, but a much more satisfactory cut is obtained. In actual practice it has been found that a stone which requires substantially a full eight-hour day to cut entirely through with the old swing-frame machine, may be cut in less than an hour upon my patented machines.

I have also found that by applying the type of saw blades disclosed in my pending application, Serial No. 538,847 (Patent No. 2,775,236), above referred to, to my patented gang saw machines, that the cutting action is greatly improved and the shocks, stresses and strains upon the machine are greatly reduced.

The invention of the present application contemplates certain improvements upon gang saw machines for cutting stone, of the type of my above-mentioned patents, particularly when provided with saw blades of the type disclosed in my above-mentioned pending application, for the purpose of improving the cutting action and further reducing shocks, stresses and strains to a minimum. This improved type of machine is especially adapted for cutting marble, granite and other very hard stone.

This is accomplished by providing a gang saw machine of the general type of my above-mentioned patents, in which a gang saw frame is continuously moved in a circular path, with auxiliary means for reciprocating the frame in a horizontal path, whereby each saw tooth performs about one-half of its cutting action while the saw frame is in the forward position and the remainder of its cutting action while the saw frame is in its rearward position.

It is therefore a primary object of the invention to provide a gang saw machine which will greatly improve the cutting action upon excessively hard stone, and in which the shocks, stresses and strains upon the machine are reduced to a minimum.

Another object is to provide such a machine in which a gang saw frame is continuously moved in a circular path and in which the gang saw also moves forward and backward in a horizontal plane, whereby the saw teeth perform about half of their cutting operations while the saw frame is in the forward position and the remainder while the saw frame is in the rearward position.

A further object is to provide a gang saw machine of this type comprising horizontal side frame members mounted for vertical movement, means for reciprocating said frame members in a horizontal plane, a gang saw frame mounted upon said side frame members, and means for moving said gang saw frame in a circular path relative to said side frame members.

A still further object is to provide a gang saw machine of the character referred to comprising corner posts, horizontal beams vertically movable upon said corner posts, horizontal side frame member suspended from said beams, means for reciprocating said side frame members forward and backward in a horizontal plane, a gang saw frame mounted upon said side frame members, and means for moving said gang saw frame in a circular path relative to the side frame members.

It is also an object of the invention to provide such a gang saw machine in which the reciprocating movement of the side frame members and the circular movement of the gang saw frame are synchronized.

Another object of the invention is to provide a gang saw machine of the character referred to, provided with saw blades in which the teeth are located in similar groups throughout the length of each blade, the teeth in each group being variably spaced so that only one tooth in each group will make contact with the stone at any one time.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being illustrated in the accompanying drawings, and set forth in detail in the following description.

The invention may be briefly described in general terms as comprising a frame consisting of four tubular corner posts connected at their upper ends by horizontal structural members, the corner posts being sufficiently spaced so that a large block of stone as removed from a quarry may be positioned between the posts, as upon a flat car.

Having briefly described the invention in general terms and pointed out the objects thereof, a preferred embodiment of the invention, illustrative of the best mode in which applicant has contemplated applying the principles, is set forth in detail in the following description and illustrated in the accompanying drawings, in which:

Fig. 2 is a top plan sectional view of the machine, taken as on the line 2—2, Fig. 1;

Fig. 3 is a front elevation of the machine;

Fig. 4 is a fragmentary, vertical, sectional view showing the swinging suspension of one of the side frame members, taken as on the line 4—4, Figs. 1 and 2;

Figure 1:
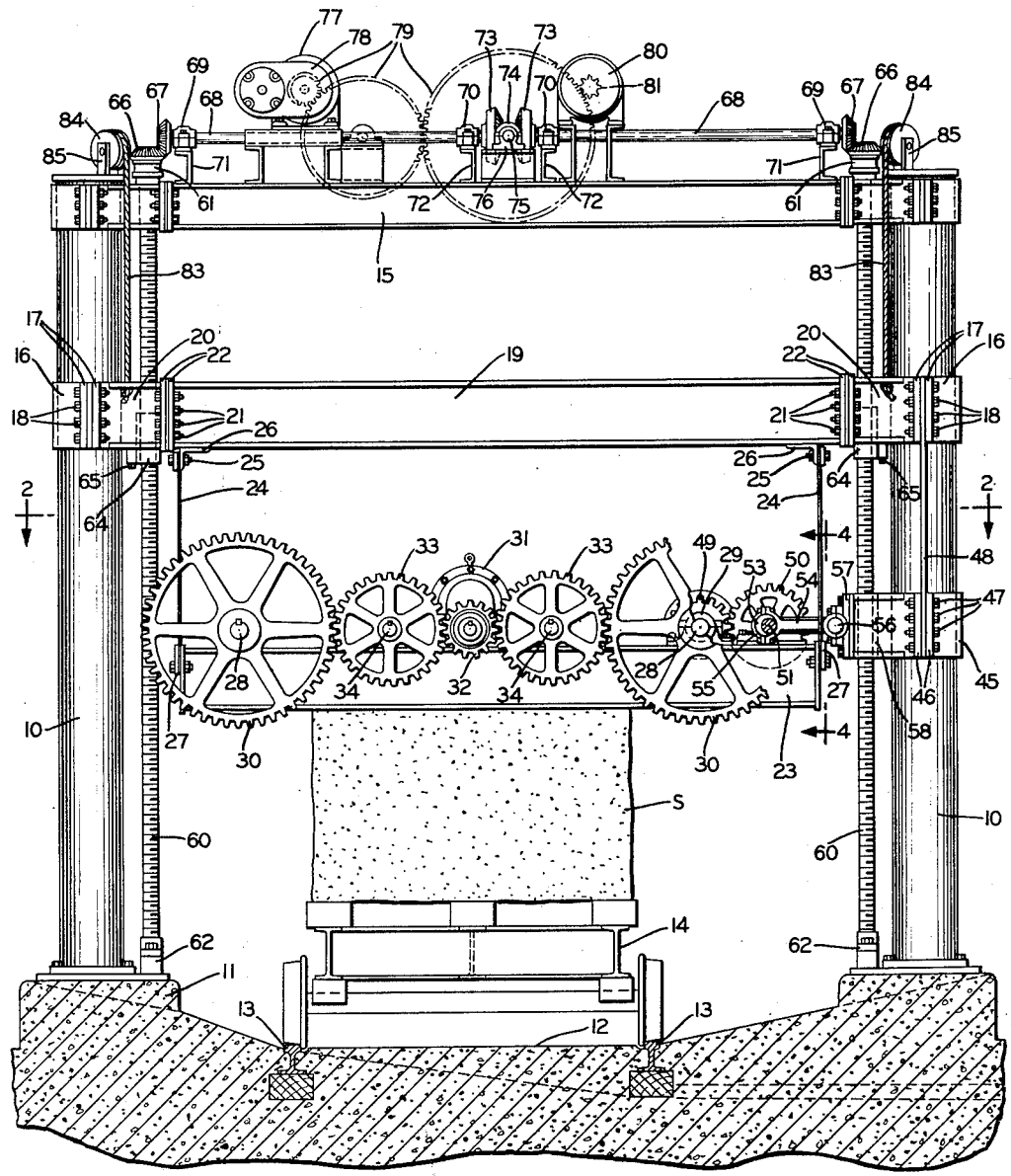
Fig. 1 is a side elevation of a gang saw machine with auxiliary reciprocal movement of the saw frame, constructed in accordance with the invention, parts being broken away for the purpose of illustration.

Fig. 5 is a vertical, longitudinal, sectional view through the gang saw frame showing the manner in which the same is suspended from the side frame members by eccentric means, as taken on the line 5—5, Figs. 2 and 3; and, Figs. 6 and 6a are diagrammatic views showing the combined reciprocating and circular movement of the saw blades;

Referring now more particularly to the embodiment of the invention illustrated, in which similar numerals refer to similar parts throughout, the machine is shown as having a main frame including the four corner posts 10, mounted upon a concrete base 11 having a pit 12 formed therein beneath the frame.

Track rails 13 are located in the pit for conveying a flat car 14, carrying a block of stone S to proper position between the corner posts of the frame, where the wheels may be blocked for holding the same in position during the sawing operation.

The corner posts 10 may be tied together at their upper ends as by the rectangular top frame 15, which may be of the general construction and arrangement shown in my prior patents above referred to.

The sawing of the stone is accomplished by a vertically movable gang of saw blades mounted for continuous circular movement in a horizontally reciprocating frame. For the purpose of the invention, upper saddles or sleeves 16 are vertically slidably mounted upon the corner posts 10.

Each of these upper saddles is formed of two parts, having opposed flanges 17 connected together as by bolts 18. Horizontally disposed beams 19 are connected at opposite ends to the inner members 20 of the upper saddles as by bolts 21 located through the opposed flanges 22 on the beam and members 20.

The reciprocating frame, in which the gang saw frame is mounted, comprises a pair of substantially horizontal side frame members 23, located below the beams 19, and flexibly suspended therefrom so as to permit horizontal reciprocal movement of the side frame members. As shown in the drawings, these side frame members terminate at each end at points spaced from the adjacent corner posts, so that the side frame members may be reciprocated back and forth therebetween.

The side frame members 23 are flexibly suspended from the vertically movable horizontal beams 19, as by the flexible strips 24 of stainless steel sheet material or the like, the upper ends of which are shown as connected by bolts 25 to the angle brackets 26, welded or otherwise rigidly attached to the beams 19, the lower ends of the flexible strips 24 being attached to the adjacent ends of the side frame members 23 as indicated at 27.

Shafts 28, perpendicular to the side frame members 23, extend entirely through the machine, near the front and rear sides thereof, and are journalled in the bearing blocks 29 attached to the upper sides of the side frame members 23, thus tying the two side frame members together in a single vertically movable and horizontally reciprocal frame.

Gears 30 are fixed to opposite ends of the shafts 28, and these two shafts are arranged to be rotated in unison by means of the motors 31 mounted centrally upon the side frame members 23. This may be accomplished by means of a pinion 32 fixed upon the shaft of each motor and meshing with the idler gears 33 upon the idler shafts 34, journalled in bearings 35 on the corresponding side frame members 23, on opposite sides of the motor 31. The idler gears 33 in turn mesh with the gears 30 so as to rotate the shafts 28 in unison.

The saw blades indicated generally at 36, are mounted as a unit in a rectangular gang saw frame shown as comprising the side members 37, in the form of H-beams or the like, and the front and back members, each comprising a pair of opposed, spaced, channel members 38, connected at opposite ends to the side members 37.

Angle members 39 may be welded, or otherwise rigidly attached, to the inner surfaces of the channel members 38, and are provided with a plurality of equally spaced slots 40 receiving the adjacent ends of the saw blades 36.

Each of the saw blades 36 comprises a flat strip of steel of suitable dimensions, and they may be of the type shown in my prior patents, above referred to, although they are preferably of the type disclosed in my above-mentioned pending application, Serial No. 538,847, and for the purpose of the present application this type of saw blade is illustrated and described herein.

Each saw blade 36 has a plurality of teeth 41 inserted in the lower edge thereof, and arranged in a plurality of similar groups, with the teeth in each group progressively spaced farther apart from the forward end to the rear end of each group, so that the shock of impact with the stone is distributed over the several teeth of each group. Each tooth has a facing 42 of carboloy or similar hardened material forming the cutting edge thereof.

These saw blades are mounted under tension in the gang saw frame 37—38, by means of tie bolts 93 attached to opposite ends of the saw blades as indicated at 94 and located between the spaced channel members 38—38, washers 95 and nuts 96 being mounted upon the threaded ends of these tie bolts for holding the saw blades under tension in the frame.

For the purpose of continuously moving the gang saw frame 37—38 in a circular path relative to the side frame members 23, eccentrics 43 are keyed or otherwise fixed upon opposite end portions of each shaft 28, and received within the eccentric bearings 44 which are mounted upon the side members 37 of the gang saw frame.

Lower saddles or sleeves 45 are slidably mounted upon the corner posts 10, below the upper saddles 16 and suspended therefrom. Although such lower saddles are shown only upon the corner posts at the forward end of the machine, it should be understood that similar lower saddles may also be mounted upon the other two corner posts.

Each lower saddle is formed of two parts having opposed flanges 46 connected together by bolts 47, and may be suspended from the corresponding upper saddle by steel bars 48. The upper ends of the bars 48 may be located between the opposed flanges 17 of the upper saddle and attached thereto by the bolts 18, and in like manner the lower ends of these bars may be located between the opposed flanges 46 of the lower saddle and attached thereto by the bolts 47. Thus it will be apparent that the lower saddles 45 will be raised and lowered upon the corner posts in unison with the upper saddles 16.

For the purpose of horizontally reciprocating the side frame assembly 23—28, and with it the gang saw frame 37—38, pinions 49 are fixed upon the shafts 28, preferably between the side frame members 23 and the gang saw frame as best shown in Fig. 2.

These pinions mesh with bears 50, fixed upon the inner ends of short shafts 51, journalled in bearings 52 mounted upon the side frame members 23. An eccentric 53 is formed or fixed upon the shaft 51, between the bearing blocks 52. A connecting rod 54 is provided at one end with an eccentric bearing 55, receiving the eccentric 53, and the other end of the connecting rod 54 is connected to the wrist pin 56 mounted in the bearings 57 upon the inner member 58 of the adjacent lower saddle 45. It should be understood that the same result may be obtained by providing a crank arm on the shaft 51 instead of the eccentric 53 shown in the drawings and above described.

It will thus be apparent that the motors 31 will, through the pinions 32 and 33 and gears 30, continuously rotate the shafts 28 which, through the eccentrics 43 and eccentric bearings 44, will continuously move the gang saw frame 37—38 in a circular path relative to the side frames 23.

At the same time, the eccentrics 53 will be continuously rotated through the pinions 49 and 50, and through the connecting rods 54 and eccentric bearings 55 thereon the side frame assembly 23—28, and with it the gang saw frame will be continuously horizontally reciprocated, while the gang saw frame is being continuously moved in a circular path relative to the horizontally reciprocating side frame assembly.

These horizontally reciprocating and circular movements are so timed or synchronized that as the horizontally reciprocating side frame assembly reaches each end of its horizontal movement, the circularly moving gang saw frame will reach the lowermost point of its circular path, whereby the teeth 41 of the saw blades 36 will contact the stone S only at such times.

The gang saw frame 37—38 is adapted to be moved vertically within the main frame during the stone sawing operation. Since the gang saw frame is carried by the side frame assembly 23—28, which in turn is suspended from the horizontal beams 19 carried by the upper saddles 16, this vertical movement of the gang saw frame is attained by vertically moving the upper saddles 16 upon the corner posts.

For this purpose, vertical feed screws 60 are located adjacent and parallel to the corner posts 10 and are journalled at their upper ends in bearings 61, mounted upon the top frame 15, and at their lower ends in thrust bearings 62, mounted on the bottom plates 15 which support the corner posts, and threaded through the nuts 64 carried by the inner members 20 of the upper saddles and attached thereto as by bolts 65. Thus by rotation of the feed screws 60 the entire assembly of upper saddles 16, horizontal beams 19, side frame members 23 and gang saw frame 37—38 may be moved upward or downward in the machine as desired.

The drive means for rotating the feed screws 60 in unison may comprise bevel pinions 66 fixed upon the upper ends of the feed screws and meshing with the bevel pinions 67 upon the outer ends of the axially aligned shafts 68, which are journalled in the bearings 69 and 70 upon the brackets 71 and 72 mounted on the top frame members 15 near the outer ends and central portions thereof respectively.

The inner ends of each aligned pair of shafts 68 are spaced apart and bevel pinions 73 are fixed thereon and mesh with the bevel pinions 74 upon opposite ends of the drive shaft 75, which is located transversely across the top frame of the machine and journalled in bearings 76 mounted thereon.

The feed screws 60 are preferably adapted to be rotated in one direction at slow speed to slowly move the gang saw assembly downward during the cutting operation and, after completion of the cutting operation the feed screws are adapted to be rapidly rotated in the opposite direction to rapidly raise the gang saw assembly so that the cut stone may be removed and another block of stone placed in position in the machine.

For the purpose of slowly rotating the feed screws to slowly move the gang saw assembly downward during the cutting operation, a slow feed drive mechanism is provided such as illustrated and described in detail in my prior Patent No. 2,720,199, above referred to. Briefly, this slow feed mechanism may comprise a variable speed motor 77 mounted upon the top frame 15 and connected, through the gear reduction 78 and gearing indicated generally at 79, with the drive shaft 75.

After the cutting operation has been completed, this slow feed drive mechanism may be disconnected from the drive shaft 75, and a high speed drive mechanism connected to the drive shaft for rapidly rotating the feed screws 60 in the opposite direction to rapidly raise the gang saw assembly.

This high speed drive mechanism may be driven by a high speed motor 80, mounted upon the top frame 15 of the machine and adapted to be optionally connected to the drive shaft 75, as through the pinion 81 upon the motor shaft and the gearing 79, any suitable clutch mechanism being interposed between the motors 77 and 80 and the drive shaft 75 for selectively connecting either motor to the drive shaft.

For the purpose of at least partially counter-balancing the weight of the upper and lower saddles, the horizontal beams 19 and the side frame and gang saw assembly carried thereby, counterweights 82 may be provided as shown in Fig. 3. A pair of cables 83 connects each counter-weight to the corresponding upper saddle 16, these cables extending upward from the saddles 16 and over the sheaves 84, journalled upon brackets 85 at the tops of the corner posts and thence downward within the corresponding corner posts and around the sheaves 86 upon the counter-weights.

In the operation of the machine, a block of stone, as indicated at S, is placed upon the flat car 14, and, with the gang saw assembly in raised position, the car is moved into position beneath the same and the wheels of the car are blocked to hold the same against movement.

The motors 31 and the slow speed motor 77 are then started so as to reciprocate the side frame assembly 23—28 horizontally and simultaneously move the gang saw frame 37—38 in a circular path while the same is moving slowly downward.

As the saw blades 36 are thus moved in a circular path and at the same time reciprocated back and forth horizontally while steadily moving downward, the cutting edges 42 of the saw teeth 41 will come into contact with the stone S only at the forward and backward limit of the horizontal reciprocating motion.

In Figs. 6 and 6a are shown diagrammatically the movement of the saw blades, indicating the combined horizontal reciprocating and circular movement.

One of the eccentrics for moving the saw frame in a circular path is indicated at 43 in Fig. 6, and the eccentric or crank for horizontally reciprocating the side frames is indicated at 53. These parts are of the relative sizes indicated in this figure, and indicate the relative amount of movement produced by each.

The eccentric 43 is rotated counter-clockwise, and the eccentric or crank 53 is rotated clockwise, as indicated by the arrows in Fig. 6. For the purpose of illustration, the periphery of the eccentric 43 is divided into equally spaced points, starting at the top at 0 and indicated at 1 to 15 inclusive, running counter-clockwise around the periphery of said eccentric.

The circle indicating the crank or eccentric 53 for producing the horizontal reciprocating movement is correspondingly divided into spaced points, starting at the top at 0 and running clockwise from top to bottom as indicated at 1 to 15. At the bottom another 0 is shown and the numbers 16 to 30 extend clockwise therefrom to the top of the circle.

In the operation of the apparatus, the horizontal crank or eccentric 53 moves one-half of a revolution while the eccentrics 43 move one full revolution, whereby the saw frame is moved through two complete circular paths during each complete horizontal reciprocation of the side frame in which the saw frame is carried.

This results in each saw tooth making approximately one-half of its cut while the frame is near one end of its horizontal reciprocation and the remainder of its cut while the frame is near the other end of its reciprocation. The shock load of contact of the saw teeth with the stone is thus additionally reduced.

The developed movement of a tooth, or any point on a saw blade, is shown in Fig. 6a. It should be pointed out here that this diagram does not take into consideration the vertical movement of the saw blade, but for the sake of simplicity shows the movement of a saw tooth during one complete horizontal reciprocation of the frame, and consequently through two complete circular movements thereof.

The line shown at T in Fig. 6a indicates the path of movement of a saw tooth, starting at the point 0, and moving counter-clockwise through the points 1 to 15 and back to 0, completing one circular path during one-half of a horizontal reciprocation, as indicated by the points 1 to 15 on the diagram 53 in Fig. 6.

This line continues through the points 16 to 30 in a counter-clockwise direction and returns to the point 0 at the top, as the second circular path is completed simultaneous with the completion of one complete horizontal reciprocation.

In order to illustrate the cutting action of each tooth, it may be assumed that the horizontal line indicated at S in Fig. 6a, is the top of a block of stone to be cut. It will be seen that as the tooth moves downward in the first circular path, it will cut into the top of the stone approximately from the points 7 to 9 thereon.

Then, as the frame is reciprocated to the opposite position, the saw tooth will make its second circular movement, cutting into the stone from approximately the point 22 in said second circular path to the point where the second circular path intersects the first circular path.

It should be remembered that, since the saw frame is continually moving vertically downward while it is reciprocating horizontally and moving in circular paths, that the second circular path will cut slightly deeper into the stone than is indicated in Fig. 6a. And in the same manner, each succeeding circular movement of the saw will cut slightly deeper into the stone.

Thus, since each saw tooth is in contact with the stone for only a relatively short period of time during each complete circular movement of the saw blades, it will be seen that the shock load of contact of the saw teeth with the stone is greatly reduced. This is especially advantageous in the sawing of relatively hard stone such as marble or granite.

While the present invention greatly improves the efficiency of such gang saw machines provided with saw blades of the type shown in my prior patents above referred to, in which the teeth are evenly spaced, it will be understood that the greatest efficiency is obtained when the invention is applied in combination with saw blades having variably spaced teeth, such as shown in my above-mentioned pending application.

In either case each saw tooth performs only about one-half of its cutting action with each complete circular movement of the saw blades, thus distributing the shock load substantially equally between the rearward and forward reciprocations of the blades, and with the variably spaced saw teeth, the shock load is further distributed over the several teeth of each group.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. Gang saw apparatus for cutting stone, comprising a main frame having vertical corner posts, horizontally disposed beams vertically slidably mounted upon the corner posts, side frame members located below said beams, sheet metal strips suspending said side frame members from said beams for substantially horizontal reciprocation, a substantially horizontally disposed gang saw frame located between said side frame members, a plurality of toothed saw blades mounted in said gang saw frame, means for positioning a block of stone within the main frame below said gang saw frame, means for moving said beams vertically, eccentric means supporting said gang saw frame upon said side frame members for continuously moving said gang saw frame so that each tooth edge of each blade is moved in a complete circular path, and means for simultaneously reciprocating said side frame members and gang saw frame horizontally.

2. Gang saw apparatus for cutting stone, comprising a main frame having vertical corner posts, horizontally disposed beams vertically slidably mounted upon the corner posts, side frame members located below said beams, means suspending said side frame members from said beams for substantially horizontal reciprocation, a substantially horizontally disposed gang saw frame located between said side frame members, a plurality of toothed saw blades mounted in said gang saw frame, the teeth being arranged in similar groups on each saw blade, the teeth in each group being variably spaced, means for positioning a block of stone within the main frame below said gang saw frame, means for moving said beams vertically, eccentric means supporting said gang saw frame upon said side frame members, means for rotating said eccentric means for continuously moving said gang saw frame so that each tooth edge of each blade is moved in a complete circular path, and means for simultaneously reciprocating said side frame members and gang saw frame horizontally, whereby the saw teeth will complete one substantially circular movement during the reciprocation of the gang saw frame in each direction and will contact the stone only at the bottom of each substantially circular movement.

3. Gang saw apparatus for cutting stone, comprising a main frame having vertical corner posts, horizontally disposed beams vertically slidably mounted upon the corner posts, side frame members located below said beams, means suspending said side frame members from said beams for substantially horizontal reciprocation, a substantially horizontally disposed gang saw frame located between said side frame members, a plurality of toothed saw blades mounted in said gang saw frame, means for positioning a block of stone within the main frame below said gang saw frame, means for moving said beams vertically, eccentric means supporting said gang saw frame upon said side frame members, means for rotating said eccentric means, for continuously moving said gang saw frame so that each tooth edge of each blade is moved in a complete circular path, and means for simultaneously reciprocating said side frame members and gang saw frame horizontally, there being two complete circular movements of the frame to each complete reciprocation thereof, so that the saw teeth contact of the stone only at the bottom of each circular movement at each end of the reciprocating movement of the gang saw frame.

4. Gang saw apparatus for cutting stone, comprising a main frame having vertical corner posts, horizontally disposed beams vertically slidably mounted upon the corner posts, side frame members located below said beams, means suspending said side frame members from said beams for substantially horizontal reciprocation, a substantially horizontally disposed gang saw frame located between said side frame members, a plurality of toothed saw blades mounted in said gang saw frame, means for positioning a block of stone within the main frame below said gang saw frame, means for moving said beams vertically, eccentric means supporting said gang saw frame upon said side frame members, means for rotating said eccentric means for continuously moving said gang saw frame so that each tooth edge of each blade is moved in a complete circular path, and a second eccentric means for simultaneously reciprocating said side frame members and gang saw frame horizontally, whereby the saw teeth will contact the stone only at the bottom of each substantially circular movement at each end of the reciprocating movement of the gang saw frame.

5. Gang saw apparatus for cutting stone, comprising a main frame having vertical corner posts, upper saddles vertically slidably mounted upon the corner posts, means for moving said upper saddles vertically, horizontally disposed beams connected at their ends to said upper saddles, lower saddles vertically slidably mounted upon certain of said corner posts below the upper saddles, means suspending said lower saddles from the corresponding upper saddles, side frame members located below said beams, means suspending said side frame members from said beams for substantially horizontal reciprocation, a substantially horizontally disposed gang saw frame located between said side frame members, a plurality of toothed saw blades mounted in said gang saw frame, means for positioning a block of stone within the main frame below said gang saw frame, means for supporting said gang saw frame upon said side frame members for continuously moving said gang saw frame so that each tooth edge of each blade is moved in a complete circular path, and cooperating means upon said side frame members and said lower saddles for simultaneously reciprocating said side frame members and gang saw frame horizontally.

6. Gang saw apparatus for cutting stone, comprising a main frame having vertical corner posts, upper saddles vertically slidably mounted upon the corner posts, means for moving said upper saddles vertically, horizontally disposed beams connected at their ends to said upper saddles, lower saddles vertically slidably mounted upon certain of said corner posts below the upper saddles, means suspending said lower saddles from the corresponding upper saddles, side frame members located below said beams, means suspending said side frame members from said beams for substantially horizontal reciprocation, a substantially horizontally disposed gang saw frame located between said side frame members, a plurality of toothed saw blades mounted in said gang saw frame, means for positioning a block of stone within the main frame below said gang saw frame, eccentric means for supporting said gang saw frame upon said side frame members for continuously moving said gang saw frame so that each tooth edge of each blade is moved in a complete circular path, and cooperating eccentric means upon said side frame members and said lower saddles for simultaneously reciprocating said side frame members and gang saw frame horizontally.

7. Gang saw apparatus for cutting stones, comprising a main frame having vertical corner posts, upper saddles vertically slidably mounted upon the corner posts, means for moving said upper saddles vertically, horizontally disposed beams connected at their ends to said upper saddles, lower saddles vertically slidably mounted upon certain of said corner posts below the upper saddles, means suspending said lower saddles from the corresponding upper saddles, side frame members located below said beams, flexible means suspending said side frame members from said beams for substantially horizontal reciprocation, a substantially horizontally disposed gang saw frame located between said side frame members, a plurality of toothed saw blades mounted in said gang saw frame, the teeth being arranged in similar groups one each saw blade, the teeth in each group being variably spaced, means for positioning a block of stone within the main frame below said gang saw frame, means for supporting said gang saw frame upon said side frame members for continuously moving said gang saw frame so that each tooth edge of each blade is moved in a complete circular path, and cooperating means upon said side frame members and said lower saddles for simultaneously reciprocating said side frame members and gang saw frame horizontally.

8. Gang saw apparatus for cutting stone, comprising a main frame having vertical corner posts, upper saddles vertically slidably mounted upon the corner posts, means for moving said upper saddles vertically, horizontally disposed beams connected at their ends to said upper saddles, lower saddles vertically slidably mounted upon certain of said corner posts below the upper saddles, means suspending said lower saddles from the corresponding upper saddles, side frame members located below said beams, flexible means suspending said side frame members from said beams for substantially horizontal reciprocation, a substantially horizontally disposed gang saw frame located between said side frame members, a plurality of toothed saw blades mounted in said gang saw frame, the teeth being arranged in similar groups on each saw blade, the teeth in each group being variably spaced, means for positioning a block of stone within the main frame below said gang saw frame, eccentric means for supporting said gang saw frame upon said side frame members for continuously moving said gang saw frame so that each tooth edge of each blade is moved in a complete circular path, and cooperating eccentric means upon said side frame members and said lower saddles for simultaneously reciprocating said side frame members and gang saw frame horizontally.

9. Gang saw apparatus for cutting stone, comprising a main frame having vertical corner posts, upper saddles vertically slidably mounted upon the corner posts, means for moving said upper saddles vertically, horizontally disposed beams connected at their ends to said upper saddles, lower saddles vertically slidably mounted upon certain of said corner posts below the upper saddles, means suspending said lower saddles from the corresponding upper saddles, side frame members located below said beams, flexible means suspending said side frame members from said beams for substantially horizontal reciprocation, a substantially horizontally disposed gang saw frame located between said side frame members, a plurality of toothed saw blades mounted in said gang saw frame, the teeth being arranged in similar groups on each saw blade, the teeth in each group being variably spaced, means for positioning a block of stone within the main frame below said gang saw frame, eccentric means for supporting said gang saw frame upon said side frame members for continuously moving said gang saw frame so that each tooth edge of each blade is moved in a complete circular path, and cooperating eccentric means upon said side frame members and said lower saddles for simultaneously reciprocating said side frame members and gang saw frame horizontally, so that the saw teeth contact the stone at each end of the reciprocating movement of the gang saw frame.

10. Gang saw apparatus for cutting stone, comprising a main frame, a substantially horizontally disposed gang saw frame reciprocally mounted in said main frame, a plurality of toothed saw blades mounted in the gang saw frame, means for positioning a block of stone within the main frame below the gang saw frame, means for moving the gang saw frame vertically, means for reciprocating the gang saw frame in a substantially horizontal plane, and means for simultaneously continually moving the gang saw frame so that each tooth edge of each blade is moved in a complete substantially circular path during the reciprocation of the gang saw frame in each direction, whereby the saw teeth will contact the stone only at the bottom of each substantially circular movement.

11. Gang saw apparatus for cutting stone, comprising a main frame, a substantially horizontally disposed gang saw frame reciprocally mounted in said main frame, a plurality of toothed saw blades mounted in the gang saw frame, means for positioning a block of stone within the main frame below the gang saw frame, means for moving the gang saw frame vertically, means for reciprocating the gang saw frame in a substantially horizontal plane, and means for simultaneously continually moving the gang saw frame so that each tooth edge of each blade is moved in a complete substantially circular path twice during each complete reciprocation of the gang saw frame, whereby the saw teeth will contact the stone only at the bottom of each substantially circular movement at each end of the reciprocating movement of the gang saw frame.

12. Gang saw apparatus for cutting stone, comprising a main frame, substantially horizontally disposed beams mounted in the main frame, side frame members located below said beams, means suspending said side frame members from said beam for substantially horizontal reciprocation, eccentric means upon said side frame members, a substantially horizontally disposed gang saw frame supported upon said side frame members by said eccentric means, a plurality of toothed saw blades mounted in said gang saw frame, means for positioning a block of stone within the main frame below the gang saw frame, means for moving said beams vertically, means for reciprocating said side frame members and gang saw frame horizontally, and means for rotating said eccentric means for continuously moving the gang saw frame so that each tooth edge of each blade is moved in a complete substantially circular path during the reciprocation of the gang saw frame in each direction, whereby the saw teeth will contact the stone only at the bottom of each substantially circular movement.

13. Gang saw apparatus for cutting stone comprising a main frame, substantially horizontally disposed beams mounted in the main frame, side frame members located below said beams, means suspending said side frame members from said beams for substantially horizontal reciprocation, eccentric means upon said side frame members, a substantially horizontally disposed gang saw frame supported upon said side frame members by said eccentric means, a plurality of toothed saw blades mounted in said gang saw frame, means for positioning a block of stone within the main frame below the gang saw frame, means for moving said beams vertically, means for reciprocating said side frame members and gang saw frame horizontally, and means for rotating said eccentric means for continuously moving the gang saw frame so that each tooth edge of each blade is moved in a complete substantially circular path twice during each complete reciprocation of the gang saw frame, whereby the saw teeth will contact the stone only at the bottom of each substantially circular movement at each end of the reciprocating movement of the gang saw frame.

14. Gang saw apparatus for cutting stone, comprising a main frame, substantially horizontally disposed beams mounted in the main frame, side frame members located below said beams, flexible means suspending said side frame members from said beam for substantially horizontal reciprocation, eccentric means upon said side frame members, a substantially horizontally disposed gang saw frame supported upon said side frame members by said eccentric means, a plurality of toothed saw blades mounted in said gang saw frame, means for positioning a block of stone within the main frame below the gang saw frame, means for moving said beams vertically, means for reciprocating said side frame members and gang saw frame horizontally, and means for rotating said eccentric means for continuously moving the gang saw frame so that each tooth edge of each blade is moved in a complete substantially circular path during the reciprocation of the gang saw frame in each direction, whereby the saw teeth will contact the stone only at the bottom of each substantially circular movement.

15. Gang saw apparatus for cutting stone, comprising a a main rame, a substantially horizontally disposed gang frame saw frame reciprocally mounted in said main frame, a plurality of toothd saw blades mounted in the gang saw frame, the teeth being arranged in similar groups on each saw blade, the teeth in each group being variably spaced, means for positioning a block of stone within the main frame below the gang saw frame, means for moving the gang saw frame vertically, means for reciprocating the gang saw frame in a substantially horizontal plane, and means for simultaneously continually moving the gang saw frame so that each tooth edge of each blade is moved in a complete substantially circular path during the reciprocation of the gang saw frame in each direction, whereby the saw teeth will contact the stone only at the bottom of each substantially circular movement.

References Cited in the file of this patent

UNITED STATES PATENTS

| | | |
|---|---|---|
| 364,459 | Young | June 7, 1887 |
| 938,473 | Gillies | Nov. 2, 1909 |
| 1,347,365 | Fletcher | July 20, 1920 |
| 2,720,199 | Blum | Oct. 11, 1955 |
| 2,720,200 | Blum | Oct. 11, 1955 |

FOREIGN PATENTS

| | | |
|---|---|---|
| 435,666 | Italy | Aug. 21, 1948 |